(12) United States Patent
Vanninen et al.

(10) Patent No.: US 10,097,308 B2
(45) Date of Patent: Oct. 9, 2018

(54) LINK ADAPTATION IN WIRELESS COMMUNICATIONS

(71) Applicant: KYYNEL OY, Oulu (FI)

(72) Inventors: Teemu Antero Vanninen, Oulu (FI); Matti Petteri Raustia, Oulu (FI); Toni Ilmari Linden, Kempele (FI)

(73) Assignee: Kyynel Oy, Oulu (FI)

( * ) Notice: Subject to any disclaimer, the term of this patent is extended or adjusted under 35 U.S.C. 154(b) by 46 days.

(21) Appl. No.: 15/445,060

(22) Filed: Feb. 28, 2017

(65) Prior Publication Data
US 2017/0324508 A1   Nov. 9, 2017

(30) Foreign Application Priority Data

Mar. 2, 2016  (EP) .................................... 16158201

(51) Int. Cl.
*H04L 1/00*  (2006.01)
*H04L 5/00*  (2006.01)
(Continued)

(52) U.S. Cl.
CPC ......... *H04L 1/0003* (2013.01); *H04B 7/0632* (2013.01); *H04L 1/0023* (2013.01);
(Continued)

(58) Field of Classification Search
None
See application file for complete search history.

(56) References Cited

U.S. PATENT DOCUMENTS

| 7,418,240 B2 * | 8/2008 | Hsu | ........................ | H04L 1/0003 |
| | | | | 370/252 |
| 7,486,668 B2 * | 2/2009 | Reichbauer | .......... | H04Q 3/0025 |
| | | | | 370/352 |

(Continued)

FOREIGN PATENT DOCUMENTS

| WO | 2006107886 A2 | 10/2006 |
| WO | 2012172162 A1 | 12/2012 |
| WO | 2013169212 A1 | 11/2013 |

OTHER PUBLICATIONS

European Search Report, Application No. EP 16 15 8201, 2 pages (dated Aug. 5, 2016).

*Primary Examiner* — Afsar M Qureshi
(74) *Attorney, Agent, or Firm* — FisherBroyles, LLP (57) ABSTRACT

A method for performing link adaptation includes in a first network node of a wireless network: initializing data transmission with a second network node of the wireless network by transmitting a request-to-send message to the second network node and by receiving a clear-to-send message from the second network node, wherein the request-to-send message and the clear-to-send message are transmitted on one or more channels of the wireless network; after said initializing, generating a first data packet of the data transmission, wherein said generating comprises processing the first data packet with link adaptation parameters fixedly associated for use in connection with first data packets of data transmissions, wherein said link adaptation parameters are included in a subset of most robust link adaptation parameters supported by the first network node; receiving, from the second network node, a message indicating new link adaptation parameters for use in a subsequent data transmission; and generating a second data packet of the data transmission, wherein said generating the second data packet comprises (Continued)

processing the second data packet with the new link adaptation parameters indicated in the message.

19 Claims, 4 Drawing Sheets

(51) Int. Cl.
    *H04B 7/06*     (2006.01)
    *H04L 27/00*     (2006.01)
    *H04L 27/20*     (2006.01)
    *H04L 27/36*     (2006.01)
    *H04L 1/06*     (2006.01)

(52) U.S. Cl.
    CPC ........ *H04L 5/0053* (2013.01); *H04L 27/0008* (2013.01); *H04L 27/2032* (2013.01); *H04L 27/362* (2013.01); *H04L 1/0009* (2013.01); *H04L 1/06* (2013.01); *H04L 5/0007* (2013.01); *H04L 5/0048* (2013.01)

(56) References Cited

U.S. PATENT DOCUMENTS

| | | | |
|---|---|---|---|
| 2002/0168993 A1* | 11/2002 | Choi | H04W 52/10 455/522 |
| 2004/0081248 A1* | 4/2004 | Parolari | H04L 1/0003 375/259 |
| 2006/0209712 A1* | 9/2006 | Morioka | H04L 1/0025 370/252 |
| 2010/0169723 A1* | 7/2010 | Baldo | H04L 43/0829 714/704 |
| 2011/0003607 A1* | 1/2011 | Forenza | H04B 7/0413 455/501 |
| 2013/0039266 A1* | 2/2013 | Ekici | H04L 1/0003 370/328 |
| 2013/0077661 A1* | 3/2013 | Jacobsen | H04W 72/0473 375/219 |
| 2017/0135098 A1* | 5/2017 | Kang | H04W 4/70 |
| 2018/0123727 A1* | 5/2018 | Yu | H04L 1/0003 |

* cited by examiner

LINK ADAPTATION IN WIRELESS COMMUNICATIONS

CROSS-REFERENCE TO RELATED APPLICATION

This application claims benefit to European Application No. 16158201.0, filed Mar. 2, 2016, which is incorporated by reference herein in its entirety.

BACKGROUND

Field

The invention relates to the field of radio communications and, particularly, to carrying out a link adaptation procedure in a radio communication system.

Description of the Related Art

Modern radio communication systems support operation on a frequency channel selected from a plurality of frequency channels according to a determined criterion. Some systems rely on frequency planning where a given frequency band is assigned to the system, and the system is configured to operate exclusively on that frequency band. Such systems are typically based on using licensed frequency bands. Other systems are configured to choose a frequency to be used more adaptively, e.g. on the basis of scanning for the available (non-occupied) frequencies and, then, transferring control messages related to negotiation of the frequency band to be used in data transmission.

Link adaptation is a process where communication parameters such as a modulation scheme and a channel coding scheme is matched with channel characteristics between two communicating radio devices. In case of a poor communication channel, a strong modulation scheme such as a binary phase shift keying (BPSK) or quadrature phase shift keying (QPSK) may be used together with a strong channel coding scheme. This improves reliability of communications with the cost of potentially reduced data rates. In case of a good channel conditions, a high-rate modulation scheme such as a quadrature amplitude modulation (QAM) may be used together with a high-data-rate channel coding scheme. This improves data rates and provides for a higher data throughput.

SUMMARY

The invention is defined by the subject-matter of the independent claims.

Embodiments of the invention are defined in the dependent claims.

BRIEF DESCRIPTION OF THE DRAWINGS

Embodiments of the present invention are described below, by way of example only, with reference to the accompanying drawings, in which.

DETAILED DESCRIPTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
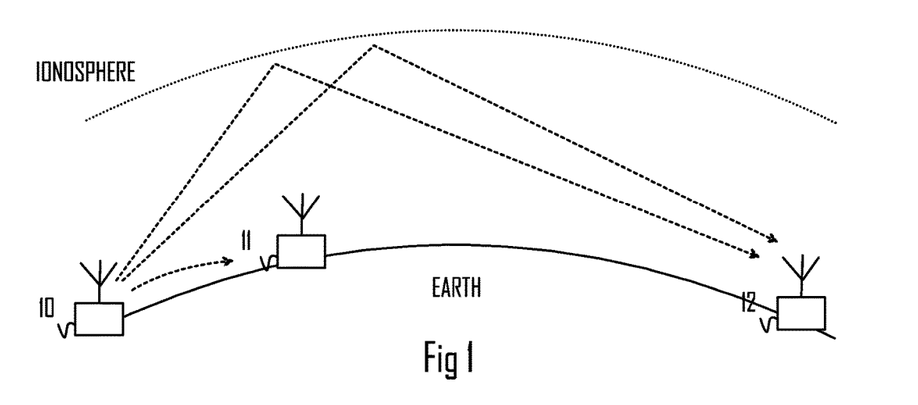
FIG. 1 illustrates communication between radio communication apparatuses in a radio communication system.

FIG. 1 illustrates an exemplary wireless telecommunication system to which embodiments of the invention may be applied. Embodiments of the invention may be realized in an ad hoc network comprising a plurality of network nodes 10, 11, 12 that may be realized by radio communication apparatuses. The ad hoc network may refer to a network that is established between the network nodes 10 to 12 without any network planning with respect to the infrastructure and/or frequency utilization. The network nodes may be operationally equivalent to each other. At least some of the network nodes 10 to 12 are free to move, and they may also be configured to route data packets that are unrelated to their own use, e.g. data packets of other network nodes. However, it should be understood that principles of the invention may be applied to other types of communication systems, e.g. wireless mesh networks, communication systems having a fixed infrastructure such as cellular communication systems, and other types of systems. The principles of the invention may also be applied to point-to-point connections, wherein two network nodes communication directly with each other without using any other network node to route the data packets.

In the embodiment of FIG. 1, the network nodes 10 to 12 have a very long communication range (even thousands of kilometers), and they may communicate directly with network nodes on the other side of the Earth. Their transmit powers may vary from a few Watts (e.g. 20 to 50 W) to even kilo Watts, depending on whether the network node is mobile or fixed and the type of power supply. For example, a network node installed to a building, a truck, or a ship may utilize high transmit powers, while a hand-held device may be limited to a few Watts. The frequency band utilized by the network nodes 10 to 12 may comprise a high frequency (HF) band (3 to 30 MHz), but it should be understood that other embodiments utilize other frequency bands, e.g. very high frequencies (VHF) or ultra-high frequencies (UHF). An advantage of HF frequencies is their long propagation range, and the fact that they may propagate via several types of communication paths. FIG. 1 illustrates a scenario where a first network node 10 communicates with a second network node 11 over surface radio waves that propagate close to the ground surface. However, a third network node 12 on the other side of the Earth may be reached via radio waves that propagate by utilizing ionospheric reflections. Some network nodes may be reached by using both surface waves and ionospheric reflections, and some embodiments of the invention are configured to utilize this property.

The network nodes 10 to 12 are configured to support communication on a high frequency band from which actual transmission frequencies may be selected according to embodiments described herein. The supported frequency band may be continuous or divided into a plurality of frequency bands separated from each other. The division may be based on the fact that there are other systems occupying some frequencies that may have a priority to occupy the frequencies, while the present system has to adapt to the frequency occupation of such a primary system. In some embodiments, the systems occupying the same frequency band have equal priority to the frequency occupation, and at least the present system may utilize cognitive channel selection procedures described herein to avoid collisions between the systems. The frequency utilization is described in greater detail below with reference to FIG. 3.

Figure 2:
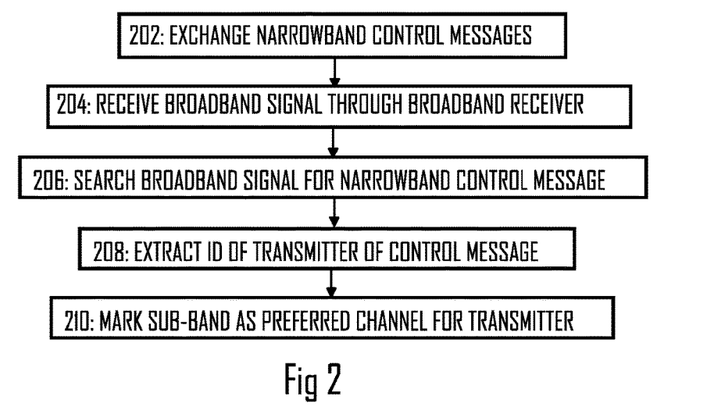
FIG. 2 illustrates an embodiment of a process for carrying out channel selection.

FIG. 2 illustrates a flow diagram of a process for operating a radio communication apparatus which may be any one of the network nodes 10 to 12. The process may be realized by a computer program executed by a computer inside the radio communication apparatus. Referring to FIG. 2, the radio communication apparatus is configured to exchange narrowband control messages with other radio communication apparatuses. Each control message comprises a pilot sequence and an identifier identifying a transmitter of the control message. In some embodiments, the control message consists of the pilot sequence and the identifier. The exchange of the control messages may be carried out repeatedly according to preset rules that may be time-based and/or need-based. With respect to the operation of the computer as defined by the computer program in block 202, the computer program may configure the radio communication apparatus to transmit, receive, and process the narrowband control messages, as described in greater detail herein.

Blocks 204 to 210 relate to the reception of a single narrowband control message in the radio communication apparatus. In block 204, the apparatus receives a broadband signal through a broadband radio receiver. The broadband radio receiver is configured to carry out the reception on a frequency band that is significantly broader than the bandwidth of the narrowband control message. In some embodiments, the bandwidth of the receiver may be more than ten times the bandwidth of the narrowband control message, and in other embodiments even hundreds or thousands time the bandwidth of the narrowband control message. In block 206, the apparatus carries out a signal detection procedure on the received broadband signal so as to detect a narrowband control message within the received broadband signal. The signal detection may be carried out for a plurality of sub-bands of the received broadband signal. For example, the received broadband signal may be divided into a plurality of sub-bands having the bandwidth corresponding to the known bandwidth of the narrowband control message, and the signal detection process may be carried out for each sub-band separately. In practice, the received signal of a given sub-band may be correlated with a pilot sequence stored in a memory of the apparatus. The pilot sequence may be the same as the pilot sequence added to the narrowband control message in its transmitter.

Upon detection of the narrowband control message on a sub-band of the received broadband signal, the transmitter of the narrowband control message is determined in block 208 from the identifier comprised in the narrowband control message. The network nodes 10 to 12 may be configured to transmit the control messages only on the sub-bands that are preferred sub-bands, e.g. the communication quality of the sub-band is estimated to be high enough by the transmitter of the narrowband control message. Therefore, a receiver of the control message may determine from the sub-band on which the control message was received that the sub-band is preferred by the transmitter of the narrowband control message. Such determination is made in block 210. Therefore, the sub-band may be utilized in data communication with the transmitter of the narrowband control message.

As a result of the above-mentioned channel selection procedure, no manual frequency planning or excessive control signalling related to the negotiation of the common frequency band(s) to be utilized in the communication is necessary. Repeated transmission of the control messages also enables fast adaptation to changing radio environment. Typically, one sub-band may have high quality for a given time period after which other systems occupy the sub-band, and the quality of the sub-band deteriorates. For example, HF frequencies are susceptible to various natural phenomena, e.g. solar activity and other radiations originating from the space, and the other radio systems also contribute to the changing radio environment. Systems with static frequency planning cannot adapt to such changes and, therefore, their performance degrades. Furthermore, the radio environment may be completely different for two network nodes far away from each other. This raises the requirements for the fast adaptation, as the probabilities that at least one of two network nodes experiences degradation of current sub-bands is increased. The radio communication apparatus may, upon detection of poor performance in the currently used sub-band(s), scan for better sub-bands and transmit the control messages on new sub-bands detected to have better quality. Upon reception of the control messages on new sub-bands, a second network node may update the preferred channel list accordingly. The channel selection process comprising the exchange of the control message(s) and the processing of the received control message(s) in the receiver may take even less than 200 ms which enables fast adaptation to the changing radio environment and necessarily no negotiation other than the unidirectional transmission of the control message. However, additional signalling may be used in connection with data transmission, as will be described below.

Figure 3:
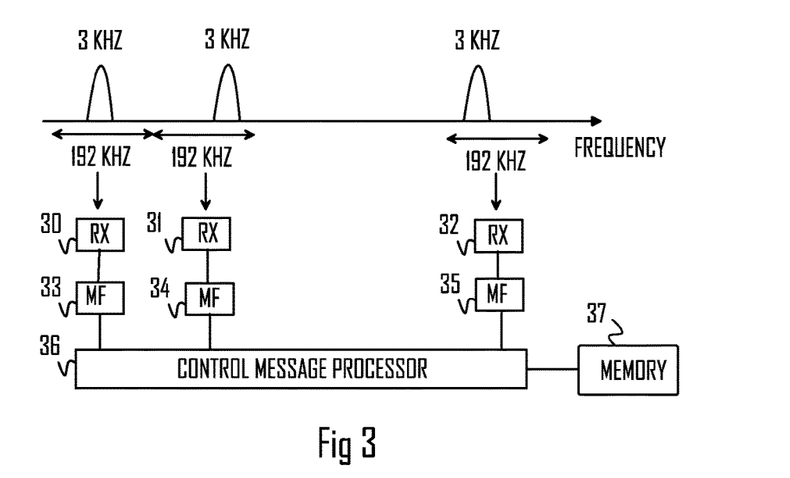
FIG. 3 illustrates an embodiment of a broadband receiver configured to receive a narrowband single-carrier transmission.

Let us consider the frequency utilization and the operation of the radio communication apparatus in greater detail with reference to FIG. 3. FIG. 3 illustrates that the operational band of the whole system is divided into a plurality of frequency blocks, each frequency block having an exemplary 192 kHz bandwidth. The radio communication apparatus is tuned to receive 192 kHz signals of each frequency block. The radio communication apparatus may comprise a plurality of radio receivers 30, 31, 32, wherein each radio receiver 30 to 32 is tuned to receive radio signals on at least one frequency block. In some embodiments where the number of frequency blocks supported by the system is higher than the number of radio receivers 30 to 32, at least some of the radio receivers 30 to 32 are tuned to receive a plurality of frequency blocks. The radio receivers 30 to 32 may then carry out frequency-hopping between said plurality of frequency blocks. The bandwidth of the actual transmissions is 3 kHz in this embodiment. Each 192 kHz frequency block is divided to 3 kHz (1 kHz or another bandwidth in other embodiments) sub-bands. In some embodiments, the number of sub-bands in the frequency blocks is the bandwidth of the frequency block divided by the bandwidth of the sub-band, e.g. 192 kHz/3 kHz=64. In such embodiments, the separation between centre frequencies of adjacent sub-bands is equal to the bandwidth of the sub-bands, e.g. 3 kHz. However, in more efficient embodiments, the separation between centre frequencies of adjacent sub-bands is lower than the bandwidth of the sub-bands. This effectively means that the sub-bands overlap in the frequency domain, but sufficient frequency separation may still be achieved so that adjacent channel interference may be mitigated in the receiver. For example, the centre frequency separation may be 1 kHz or even 500 Hz, while the bandwidth of the sub-band is several kHz. In other embodiments, a guard band is provided between adjacent sub-bands. The transmitter may be configured to select one or more sub-bands per frequency block to carry out the transmission. If a frequency block does not contain an unoccupied sub-band, the frequency block may be bypassed in the selection of the sub-band. As a consequence, the number of sub-bands used in the transmission may be equal to the number of frequency blocks supported by the system. However, as mentioned above, the number of sub-bands used in the transmission may be other than the number of frequency blocks, when zero to more than one sub-band may be selected per frequency block. The sub-bands used in the transmission are typically non-consecutive except for in special cases, e.g. when the highest sub-band of a first frequency block and the lowest sub-band of a neighbouring frequency block on a higher frequency are selected for the transmission.

As the transmitter may select the sub-bands on which to transmit the control messages, each broadband receiver 30 to 32 do not necessarily know on which one of the 64 (or 192) sub-bands of the frequency block the transmission is located. As a consequence, each receiver branch may comprise a matched filter 33, 34, 35 matched to the waveform of the pilot sequence and configured to scan for the (3 kHz) sub-bands of the received broadband (192 kHz) signal and to detect the pilot sequence known to be comprised in the control message. Each network node 10 to 12 may utilize the same pilot sequence in order to reduce the complexity of the matched filter structure 33 to 35. The structure of the pilot sequence is described in greater detail below with reference to FIG. 5.

In an embodiment, the receiver utilizes time-domain correlation, wherein each radio receiver 30 to 32 divides the received 192 kHz broadband signal into 3 kHz sub-bands by using a bandpass filter structure which may be realized by a filter bank dividing the received signal into a plurality of (3 kHz) sub-band signals, for example. Then, the narrowband 3 kHz signals are applied to a corresponding matched filter 33, 34, or 35, and the matched filter carries out a correlation with each 3 kHz signal so as to detect a correlation peak that would indicate the presence of the pilot sequence in the received signal. In order to detect the correlation peak, the matched filters 33 to 35 may employ a peak detector comparing the result of the matched filtering with a threshold value. A result exceeding the threshold is considered as a detection of the pilot sequence in the received signal.

In another embodiment, the time-domain correlation is replaced by a (fast) Fourier transform of the received signal and a multiplication between the transformed received signal and a frequency-domain representation of the pilot sequence. This type of filtering procedure may employ the known overlap-and-add method or overlap-and-save method.

In another embodiment, the receiver utilizes an OFDM (Orthogonal Frequency Division Multiplexing) or, in general, a multicarrier receiver structure designed for receiving multicarrier signals, that is signals having symbols on a plurality of parallel orthogonal sub-carriers. As the symbols are separated in frequency, the OFDM receiver is typically configured to process the received signals in a frequency domain. The OFDM receiver may be tuned to receive a frequency block (192 kHz), and it may be configured to consider each (3 kHz) sub-band as a "sub-carrier". As a consequence, a single-carrier control message is received with a multi-carrier receiver. As the OFDM receiver processes the received signal in the frequency domain, the radio receiver 30 to 32 may comprise a Fourier transform circuitry configured to convert the received signal into a frequency domain representation. A time window for the Fourier transform may be selected to be the duration of the pilot sequence of the narrowband control message. Thereafter, the matched filters 33 to 35 matched to the waveform of a frequency-domain representation of the pilot sequence process each sub-band. In the frequency domain, the matched filtering procedure comprises a simple multiplication between the received signal and the pilot sequence, thereby providing computationally less complex correlation than with a convolution used in the time-domain correlation.

As known in the art, the matched filters 33 to 35 may be replaced by a correlator structure.

Upon detection of the pilot sequence in one of the sub-bands of the received signal, the sub-band signal is applied to a control message processor 36 that may be configured to process the sub-band signal. The processing may comprise applying receiver signal processing algorithms, e.g. equalization, to the sub-band signal. The pilot sequence contained in the received sub-band signal may be used as a training sequence for the equalization (a channel response may be estimated from the pilot sequence) and for other signal processing algorithms. Then, the control message processor 36 may extract a payload portion of the control message contained in the sub-band signal and recover an identifier contained in the payload portion. Upon deriving the transmitter of the control message from the identifier, the control message processor 36 may store in the memory 37 the corresponding sub-band as a preferred channel for that transmitter. Thereafter, that sub-band may be used in communication with the transmitter.

Figure 4:
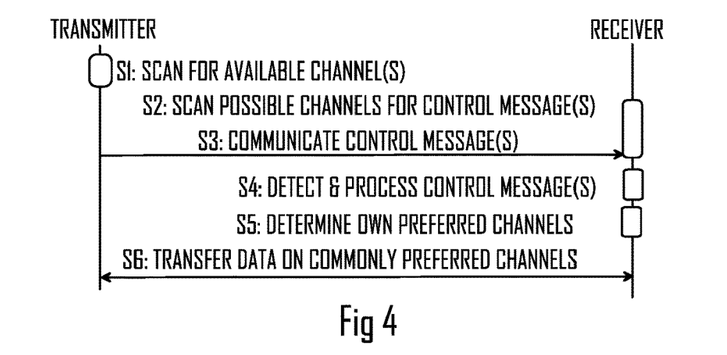
FIG. 4 illustrates a signalling diagram of a channel selection process according to an embodiment of the invention.

Let us now consider the channel selection process on a higher level with reference to FIG. 4. FIG. 4 illustrates a signalling diagram illustrating how a transmitter and a receiver, which both may be the network nodes 10 to 12 of FIG. 1, determine the channel(s) over which to communicate with one another. Let us note that the terms transmitter and receiver are only related to the transmitter of the control message and the receiver of the control message, and the roles may be reversed in other contexts, e.g. in the data transmission or transmission of a control message to the other direction. Referring to FIG. 4, the transmitter first carries out in S1 a scanning process on some or all channels supported for communication. The transmitter determines in S1 the channel(s) that provide the highest channel quality. The transmitter may be configured to select one channel per frequency block, wherein the selected channel may have the highest channel quality within the frequency block. Quality estimates may be based on estimating received signal strength on each channel, signal-to-noise ratio (SNR) or signal-to-interference-plus-noise ratio (SINR) on each channel, or on any other channel quality metric.

In S2, the receiver scans the frequency blocks and corresponding sub-bands with the broadband radio receiver for presence of narrowband control messages, as described above. S1 and S2 are mutually independent processes, and their respective timings may vary, e.g. S2 may be carried out before or at the same time as S1. Upon selecting the channel(s) or sub-bands of frequency blocks in S1, the transmitter transmits in S3 one or more control message(s) on the selected channel(s). The control messages may be broadcast messages that are not addressed to any specific receiver. As a consequence, any network node capable of receiving the control message may process the control message. Upon reception of the control message(s) on the respective channel(s) in S3, the receiver detects the control message(s) and processes them in S4 so as to derive the identifier of the transmitter from the message(s) and to carry out association between the channel(s) and the transmitter. As a consequence, the receiver derives a list of channels preferred by the transmitter. Then, the receiver determines the channels it prefers in S5. This may be obtained through a process similar to the one carried out in S1. The receiver may then make a comparison between the channels preferred by the transmitter and the channels preferred by the receiver. The commonly preferred channels may then be used in data transfer between the transmitter and the receiver in S6. Sometimes, the channels preferred by transmitter and the receiver overlap only partially (or do not overlap at all), and in such cases the receiver may determine S6 those channels that provide the best channel quality for the receiver. The channel selection in connection with the data transfer is described in greater detail below.

The channel selection of FIG. 4 may be carried out repeatedly by exchanging the control messages between the network nodes 10 to 12. The transmission of new control messages may be triggered on a time basis and/or on a need basis, as mentioned above. For example, a network node may be configured to carry out the channel selection process periodically. In another example, the network node may be configured to carry out the channel selection upon degradation of at least some of the currently selected channels. A trigger may be that there is less than a determined number of channels with sufficient quality, and the sufficient quality may be determined by a given metric (e.g. SINR and/or bit/packet error rate) and a threshold. Other criteria for triggering the selection of new channels may also be used. The control messages may be transmitted periodically or otherwise regularly to maintain connectivity of the wireless network and/or to keep other device up-to-date of the sub-bands preferred by the transmitter.

Figure 5:
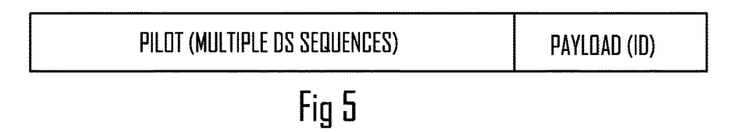
FIG. 5 illustrates an embodiment of a format of a control message.

FIG. 5 illustrates an embodiment of a format of the narrowband control message. As mentioned above, the control message may comprise the pilot header and the payload comprising the identifier of the transmitter of the control message. The pilot header may comprise a plurality of concatenated pilot sequences to provide a long pilot sequence that occupies more than half of the length of the control message. In an embodiment, the pilot header comprises four concatenated pilot sequences, wherein each pilot sequence has the length of 32 chips. The sequences may be direct sequence (DS) codes used in spread spectrum communications. Examples of the sequences that may be used as the DS pilot sequence include m-sequences and Gold sequences. However, in this case the DS sequences are not used to increase the symbol rate of the control message, contrary to how they are used in the spread spectrum communications. In fact, the symbol rate of the pilot sequence may be the same as the symbol rate of the payload portion. In the example of four 32-chip sequences and a 16-bit identifier and a chip length equaling the bit length, the total length of the control message is 144 bits. In the example of 3 kHz narrowband control message, the symbol rate may be 3 ksps (kilosymbols per second). The long pilot sequence maximizes the probability of receiving the control message in the receiver. Remember that each radio receiver may scan for a plurality of frequency blocks and, possibly, is not able to monitor each channel continuously. Using a long pilot sequence then improves the probability of detecting the control message. The matched filter of the receiver may be matched with a single pilot sequence, and not necessarily with the whole concatenated pilot part of the control message. Long pilot sequence also enable determining whether the received signal is a surface wave or an ionospheric reflection, better channel estimation, etc.

The payload may also comprise an encrypted time stamp to suppress repetition interference. A control message having an expired time stamp may be considered as interference and, thus, be discarded.

In some embodiments, the pilot header may be unique for each network node and, thus, the pilot header functions as the identifier of the network node. Thus, the payload may even be omitted, and the control message may consist of the unique pilot header. In other embodiments, the pilot header may be common to at least some of the network nodes, and the payload may comprise a unique (DS) sequence which may function as the identifier.

Figure 6:
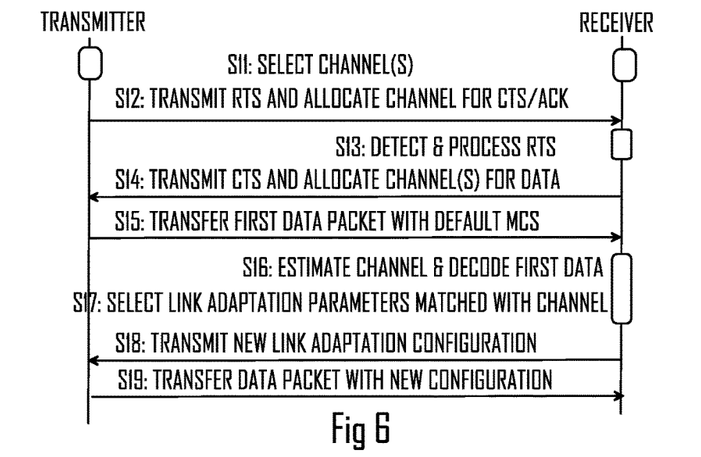
FIG. 6 illustrates a signalling diagram of a data transfer process according to an embodiment of the invention.

Let us now consider the data transmission in the network according to an embodiment of the invention with reference to FIG. 6. Let us assume that the channel selection through the transmission of the narrowband control messages has been conducted in the above-described manner or according to another principle. The channel selection is carried out in S11, and it may be carried out in both the transmitter and the receiver or at least in the transmitter. In S12, the transmitter determines to carry out a data transmission with the receiver. Parameters of the data transmission may be negotiated through an initialization phase in which the transmitter transmits a transmission request message (e.g. a request-to-send, RTS) to the receiver, and the receiver responds with a transmission response message (e.g. a clear-to-send, CTS). In S12, the transmitter transmits the RTS message to the receiver. The function of the RTS message may be for the transmitter to indicate to the receiver that the transmitter has data to be transmitted to the receiver. The RTS message may be transmitted on a plurality of channels, e.g. on a sub-band of every frequency block for which the transmitter has selected a sub-band.

Figure 7:
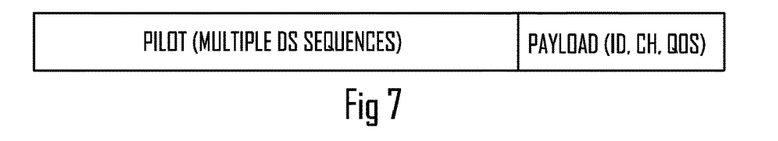
FIGS. 7 and 8 illustrate formats of a transmission request message and a transmission response message according to some embodiments of the invention.

FIG. 7 illustrates an embodiment of the RTS message. The RTS message may comprise the same pilot sequence as a header as the control message of FIG. 5. As the payload portion, the RTS message may comprise the identifier of the transmitter and the identifier of the recipient of the RTS message, which both may be unique for each network node 10 to 12. The RTS message may also comprise an information element used to specify how much data the transmitter needs to transmit. This information element may be used to define a quality-of-service (QoS) classification of the data being transmitted. The QoS classification may specify real-time requirements for the data, and typical QoS classifications may include conversational and streaming as real-time classes and interactive and background as non-real time classes. Other QoS classes are equally applicable. The RTS message may further comprise a field specifying at least one channel to be used as a feedback channel for at least the CTS message but, optionally, also for the data transmission. This field may be used by the transmitter to specify at least one (but in some embodiments a plurality, e.g. four) feedback channel on which the CTS message is to be transmitted. Furthermore, the feedback channel(s) may be used to convey positive/negative acknowledgment messages (ACK/NACK) indicating successful/erroneous data reception, respectively. The transmitter may use the RTS message to request for certain communication parameters for use in the data transmission, and the requested communication parameters may include the QoS classification and/or bandwidth of the data transmission.

Upon reception of the RTS message in S12, the receiver detects the RTS message in S13 on the basis of the matched filtering the pilot sequence, as described above. Furthermore, the receiver may detect from the structure or from a specific identifier contained in the message that the message is the RTS message and not the conventional control message of FIG. 5. Upon determining that the message is the RTS message, the receiver extracts the payload portion of the RTS message and processes the transmission request. The extraction may again comprise equalization based on using the pilot header as the training sequence, and also synchronization with symbol timing of the RTS message may be carried out on the basis of the pilot header, as may be done with the control message of FIG. 5.

In S13, the receiver detects the QoS classification of the request (or another indicator specifying the amount of transmission resources needed), determines the number of sub-bands needed to comply with the request, and selects the sub-bands. The selection of the sub-bands may be based on selecting the necessary number of sub-bands that are determined to provide the highest channel quality for the communication. Let us remind that the radio environments may be different for the transmitter and the receiver because of great distance, for example, so the receiver may select the sub-bands that are preferred by the receiver in order to enable reception of the data. Again, one sub-band per frequency block may be selected for the data transfer, but in other embodiments multiple sub-bands per frequency block may be selected. In other words, the receiver may take the communication parameters requested by the transmitter in the RTS message into account but make an autonomous decision as to the selection of the sub-band(s) and the bandwidth for the data transmission.

Figure 8:
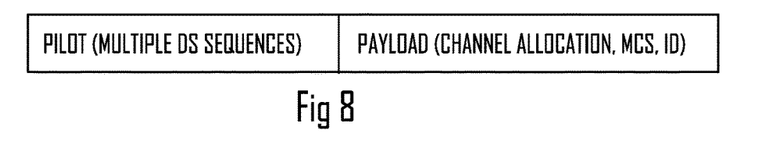

In S14, the receiver prepares the CTS message for transmission to the transmitter. FIG. 8 illustrates an embodiment of the format of the CTS message. The CTS message may comprise the above-mentioned pilot header, but the number of concatenated pilot sequences contained in the pilot header may be different than in the control message and the RTS message. As the transmitter has already specified the sub-band(s) for the CTS message, it is configured to monitor for those sub-bands for the CTS message. Therefore, a shorter pilot header may be used in the CTS message. The payload part of the CTS message may comprise the identifier of the receiver (the transmitter of the CTS message), the channel allocation for the data transmission comprising the selected sub-bands, thus defining the bandwidth for the data transmission. The channels may be identified by using channel indexes, wherein each sub-band has a unique channel index. The CTS message may further identify any other communication parameters of the data transmission. With respect to the communication parameters of the CTS message itself, the CTS messages may be encoded and modulated with a default modulation and coding scheme associated with the CTS messages. The receiver may employ a robust modulation and coding scheme may be used to ensure reliable reception of the CTS message in the transmitter. As known in the art of wireless communications robustness is commonly defined in terms of reliability against errors. In S14, the receiver transmits the CTS message to the transmitter on the channel(s) specified in the RTS message. It should be noted that the channel allocation specified in the CTS message may specify at least some different channels than those specified in the RTS message for the transmission of the CTS message and the ACK/NAKs. Accordingly, the RTS message, the CTS message, and the data transmission may all employ completely or partially different sub-bands. The transmitter receives the CTS message in S14. The transmitter uses the pilot header for timing synchronization and/or for the equalization of the CTS message, and extracts the payload part of the CTS message. Then, the transmitter configures its transmitter parts for transmission with the parameters specified in the CTS message.

In S15, the transmitter carries out the data transmission on the sub-band(s) allocated in the CTS message. S15 may comprise generating a first data packet of the data transmission. The transmitter may process the first data packet with link adaptation parameters fixedly associated for use in connection with first data packets of data transmissions. Such link adaptation parameters may be included in a subset of most robust link adaptation parameters supported by the first network node.

In an embodiment, the link adaptation parameters used in the processing of the first data packet of the data transmission may be the most robust link adaptation parameters available for use in the data transmission. In another embodiment, the link adaptation parameters used in the processing of the first data packet of the data transmission may be one of two, three, or four most robust link adaptation parameters available for use in the data transmission. The most robust link adaptation parameters may be particularly suitable in wireless communications where the radio channel is subject to changes between data transmissions, e.g. in long-range HF communications. If a prior channel estimate of the radio channel has expired, the radio channel is probably unknown, and the selection of the most robust link adaptation parameters for the first data packets ensures that at least some data will be delivered.

In each embodiment, the link adaptation parameters may be fixedly used for processing the first data packet of all data transmissions. Accordingly, the transmitter needs not to employ any selection criterion or any complicated selection logic, and the selection of the link adaptation parameters does not need a channel estimation procedure, for example. Since the link adaptation parameters of the first data packet are fixed, there is neither need for the transmitter to separately signal the link adaptation parameters to the receiver.

The link adaptation parameters may define at least one of a modulation scheme and a channel coding scheme. The modulation scheme associated with the first data packet may be a reliable modulation scheme such as binary phase-shift keying (BPSK) or a quadrature phase-shift keying (QPSK). The channel coding scheme may associated with the first data packet may be the one that provides the most reliable coding of payload data, e.g. a channel coding scheme encoding the highest number of parity bits or the highest number of error decoding bits per data bit amongst the channel coding schemes employed by the devices of the data transmission.

Employing robust or the most robust link adaptation parameters in connection with the first data packet improves the probability of transmitting the first data packet correctly to the receiver and the probability of the receiver to detect the first data packet in S15. As a consequence, upon receiving the first data packet in S15, the receiver may then both decode the payload data of the first data packet and, additionally, carry out channel estimation on the channel or sub-bands allocated to the data transmission (S16). As mentioned above, the first data packet may be the first communication between the transmitter and the receiver on the sub-bands allocated to the data transmission.

In an embodiment, the channel estimation in S16 comprises estimating a signal-to-noise ratio (SNR) or a signal-to-noise-plus-interference (SINR) ratio from the first data packet. In another embodiment, the channel estimation in S16 comprises estimating a modulation error ratio (MER) or an error vector magnitude (EVM) from the first data packet. In yet another embodiment, the channel estimation in S16 comprises estimation of the MER and the estimation of the SNR and/or the SINR. Computation of all these metrics representing characteristics of a radio channel between the transmitter and the receiver are as such known to the skilled person as such so detailed description of them is omitted. Suffice to say that the SNR and SINR represent the signal strength of a desired signal (carrying the first data packet) versus measured noise or noise-plus-interference strength, while the MER and EVM are measures of how much received information symbol values deviate from their ideal locations in a symbol constellation of a modulation scheme, e.g. a QPSK or QAM. The EVM or MER may be computed for a plurality of symbols comprised in the received first data packet, and an average of the EVM/MER values may be computed to determine the channel estimate. An output of the channel estimation in S16 is a value that represents the channel characteristics, e.g. a SINR value, a MER value, or an EVM value.

In S17, the receiver determines, on the basis of the channel estimation, new link adaptation parameters matched with the channel characteristics of the estimated radio channel. In an embodiment, the receiver may use a mapping table that maps values representing different channel characteristics to corresponding link adaptation parameter configurations. The mapping table may map a value representing good channel conditions to a link adaptation parameter configuration providing high data rate, e.g. a quadrature amplitude modulation (QAM) scheme and/or a high data rate channel coding scheme. On the other hand, the mapping table may map a value representing poor channel conditions to a link adaptation parameter configuration providing high reliability of transmission, e.g. a BPSK modulation scheme and/or a low data rate channel coding scheme. In general, the mapping table may associate each value to a link adaptation configuration so that the receiver is able to determine a link adaptation configuration matched with the channel characteristics on the basis of the value and the mapping table.

Figure 9:
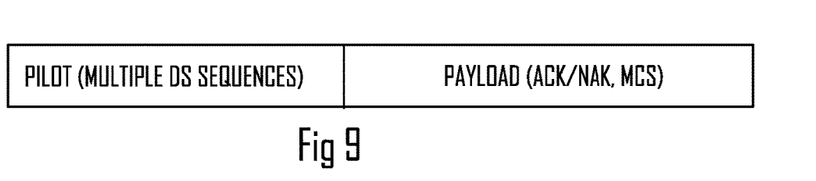
FIG. 9 illustrates an embodiment of an acknowledgment message indicating link adaptation parameters for subsequent data packets.

In S18, the receiver generates a message indicating the new link adaptation parameters selected in S17 and transmits the message to the transmitter. FIG. 9 illustrates an embodiment of the message. In the embodiment of FIG. 9, the message is a first acknowledgment message acknowledging reception of the first data packet. The message may comprise any one of the pilot sequences described above in its header and, additionally, comprise a payload portion. The payload portion may comprise an information element indicating whether or not the first data packet was correctly received by the receiver. The payload portion additionally comprises the new link adaptation parameters selected in S17. The link adaptation parameter configuration may be indicated in the message by an index unique to the selected link adaptation parameter configuration or otherwise explicitly indicating the selected link adaptation parameters.

Upon receiving the message in S18, the transmitter may determine the new link adaptation parameters from the received message and adjust the link adaptation parameters used in the data transmission with the receiver. As a consequence, the transmitter may process subsequent data packets with the new link adaptation parameters, e.g. the new modulation scheme, mapped to the channel conditions estimated by the receiver and transmit the subsequent data packets with the new link adaptation parameters in S19.

In an embodiment, the receiver may acknowledge the subsequent data packets with one or more acknowledgment messages that do not comprise the information element indicating the new link adaptation parameters configuration. However, upon determining that the link adaptation parameters need to be changed as a result of changed channel conditions, the receiver may send the acknowledgment message of FIG. 9 to cause the transmitter to change the link adaptation parameters. The receiver may regularly monitor the channel conditions, e.g. by carrying out the channel estimation of S16 for the subsequent data packets of the data transmission.

In the context of FIG. 6, the data transmission may be defined as a time period spanning over transmission of a plurality of data packets between the transmitter and the receiver. The data transmission may be defined as being started by the above-described initialization phase and being terminated by an explicit link termination message, e.g. initiated by the transmitter upon having no more data to be transmitted to the receiver.

In an embodiment, S17 comprises modifying the value representing the channel characteristics with a backoff factor. The backoff factor may be used to degrade, by a determined degree defined by the value of the backoff factor, the channel characteristics estimated in the channel estimation in S16. Thereafter, the receiver may select in S17 the new link adaptation parameters matched with the channel characteristics degraded by the backoff factor. The backoff factor may be a multiplier or an offset value that defines a safety margin for the estimated channel conditions by selecting link adaptation configuration that is designed to sustain worse channel conditions than those directly indicated by the estimated channel characteristics. Such a safety margin may avoid the need for immediate readjustment of the link adaptation configuration in case the channel conditions abruptly degrade. It may also reduce the need for retransmissions of data packets in a case the channel conditions degrade.

The receiver is configured to monitor for those sub-bands allocated for the data transmission. Upon reception of the data transfer on those sub-bands, the receiver processes the received data by carrying out data detection and decoding algorithms. Upon successful reception of the data, the receiver is configured to transmit an ACK message on the sub-band(s) specified in the RTS message. However, upon erroneous reception of the data, the receiver is configured to transmit a NAK message on the sub-band(s) specified in the RTS message. The first acknowledgment message may also be transmitted on the sub-band(s) specified in the RTS message. In some embodiments, the receiver responds only to the correct reception (ACK) or to the erroneous reception (NAK) of the data. For example, when the receiver acknowledges only the correct receptions by transmitting ACK, the transmitter detects erroneous reception upon detection of no ACK message for a given data packet. Any hybrid automatic repeat request (HARQ) procedures are also possible, wherein upon detecting erroneous reception of a data packet, a retransmission comprises either the same data packet (chase combining) or additional information (e.g. parity bits) that help the decoding in the receiver. The latter embodiment is known as incremental redundancy HARQ.

In this manner, the data transfer continues between the network nodes 10 to 12. The other network nodes not part of the data transfer between the transmitter and the receiver may also be configured to monitor for at least the RTS messages. After all, all the network nodes monitor for transmissions and receive radio signals, process them to some degree after they determine whether or not the message concerns them. For example, a network node may extract a message to some degree before it is able to determine whether the message is the control message of FIG. 5 or the RTS message of FIG. 7 or whether or not an acknowledgment message comprises the new link adaptation parameters. In an embodiment, the network node may utilize this feature to such degree that if the received message is the control message of FIG. 5, the network node may update the channel list used with the transmitter of the control message. However, if the received message is the RTS message not addressed to the network node, the network node may extract the identifier of the transmitter of the RTS message and determine that the transmitter of the RTS message is reserved for a determined period of time. If the RTS message contains information that enables the determination of the time period the transmitter is reserved, the network node may use that information to derive the reservation period for the transmitter. In other embodiments, the network node may set a default reservation period. Similarly, the network node may derive the identifier of the receiver of the RTS message, and set a corresponding reservation period for the receiver. As a consequence, the RTS message may be used as an indicator that the transmitter and the receiver are reserved and no data should be transmitted to them during the reservation period. In some embodiments, the network node is configured to disregard the CTS messages and, as a consequence, the channel(s) or sub-bands specified in at least the CTS message. Accordingly, the network node may carry out transmission/reception on those sub-bands. In other embodiments, the network node is configured to extract the CTS messages as well, and to prevent transmission on the sub-bands allocated to the data transfer or transfer of ACK/NAKs that are specified in the RTS and the CTS messages. As a consequence, the RTS and CTS messages may be used to carry out channel reservation and protection of the data transfer.

In an embodiment, different link adaptation parameters are defined for different bandwidths. The transmitter and the receiver may store a database comprising optimum link adaptation parameters for each bandwidth. The database may be substantially static such that the channel conditions etc. does not affect the contents of the database. Upon receiving the CTS and the sub-band allocation defining the bandwidth for the data transmission, the transmitter may determine the optimum link adaptation parameters for the bandwidth from the database and employ the determined optimum link adaptation parameters in the transmission of the first data packet. Similarly, upon transmitting the CTS and the sub-band allocation defining the bandwidth for the data transmission, the receiver may determine the optimum link adaptation parameters for the bandwidth from the database and prepare to receive the first data packet with the determined link adaptation parameters. After the first data packet, the link adaptation parameters for the subsequent data packets may be adapted to the channel conditions, as described above. In other words, the database may store the link adaptation parameters fixedly associated with the first data packet for different bandwidths. In an embodiment, the database may store more link adaptation parameters in such manner that the robustness of the link adaptation parameters increases together with the increase of the bandwidth. In other words, stronger link adaptation parameters may be defined for a wider bandwidth than for a narrower bandwidth.

The physical layer channel selection principles of the above-described embodiments may also be utilized in equipping the network nodes 10 to 12 with link layer and/or network layer intelligence. As each channel may be utilized by a plurality of network nodes, each network node may be equipped with Medium Access Control (MAC) logic realizing, for example, a carrier sense multiple access (CSMA) procedure in which the network node senses the sub-bands it intends to in the transmission prior to carrying out the transmission on those sub-bands. If the sub-band is detected to be free, the network node proceeds to transmission. On the other hand, if the sub-band is detected to contain interference (e.g. another user/system), the network node may tune to another sub-band and carry out the CSMA on that channel. The channels sensed in the CSMA process may be the channels allocated to be preferred by the network nodes carrying out the data transfer over a radio link. The network node may also employ collision detection and/or collision avoidance procedures to avoid collisions. This may be applied to the transmission of the control message, the RTS message, the CTS message and/or the data. The channel selection procedure in the RTS/CTS handshake is another example of the MAC procedures implemented in the network. With respect to the network layer, as each network node 10 to 12 stores a list of other network nodes with which it is able to communicate, the network nodes may be configured to exchange routing messages. A routing message may comprise a list of network nodes a given network node 10 to 12 is able to reach, either directly or indirectly. This enables the other nodes to construct a routing table comprising a list of nodes that may be reached through a given neighbour node. The routing tables may be used to determine routes in the ad hoc network, e.g. by determining through which node a given destination node may be reached. Thus, the routing tables may be used in transmitting and forwarding the data packets. The routing tables may be seen as higher layer signalling, and the routing tables may be transmitted as data in the physical layer. As a consequence, the transmission of the routing table may be carried out through the RTS/CTS handshake procedure.

Figure 10:
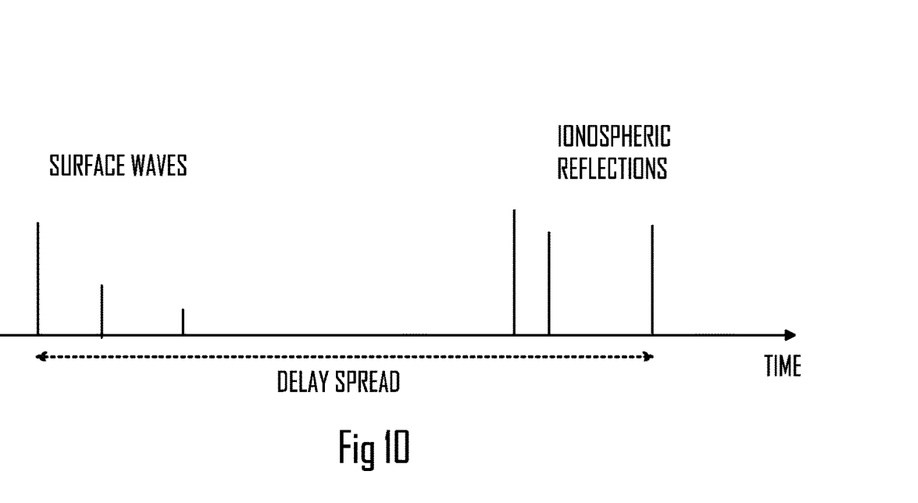
FIG. 10 an example of delay spread of a radio signal.
Figure 11:
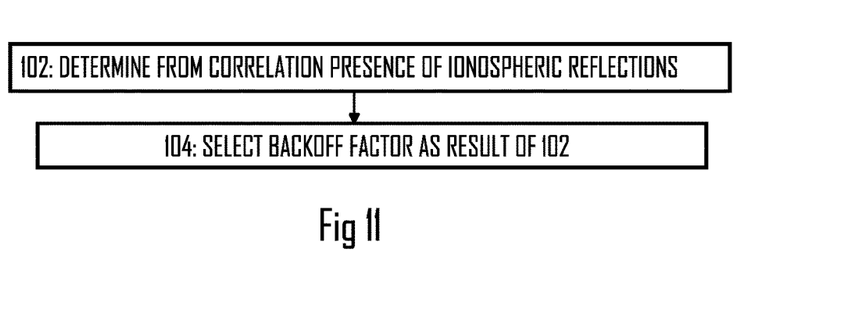
FIG. 11 illustrates an embodiment of a process utilizing multiple radio propagation paths for determining link adaptation parameters.

In the embodiments utilizing the HF frequencies, the presence of the ionospheric reflection as a radio path is available. The receiver of the control message(s) is able to determine the presence or absence of the ionospheric reflection from the received control message, if the pilot sequence is sufficiently long. Therefore, the length of a pilot sequence comprised at least in the control message and in the RTS message may be selected to be longer in time than the longest expected delay in the signal propagation, e.g. the length of the pilot sequence may be up to 6 ms. As mentioned above, the pilot header may comprise a plurality of such concatenated pilot sequences. FIG. 10 illustrates correlation peaks representing signal components of the transmitted control message that arrive at the receiver at different time instants, wherein each peak represents a signal component travelled through a different signal path in the radio channel. Surface waves that propagate approximately through a direct path from the transmitter to the receiver typically arrive before the ionospheric reflections that propagate a longer distance to the ionosphere and back to the ground surface. This shows as different signal groups in the delay spread illustrated in FIG. 10. A signal group consisting of the surface waves is typically separated from the signal group consisting of the signal components reflected from the ionosphere. Any state of the art signal grouping algorithm may be applied to the matched filter outputs determine whether there is one signal group indicating the presence of only the surface waves or the ionospheric reflection or two signal groups indicating the presence of both the surface waves and the ionospheric reflection. This information may be used in the selection of the link adaptation parameters according to some embodiments, as illustrated in FIG. 11. Another embodiment for determining the signal propagation route employs a distance between the network nodes as derived from location coordinates of the network nodes. The locations of the network nodes may be determined by employing a global navigation satellite system (GNSS) such as a Global Positioning System. If the distance between the devices is higher than a determined threshold, it may be assumed that the propagation path is or comprises the ionospheric reflection. Otherwise, the propagation path may be determined to be or comprise surface waves.

Other embodiments for detecting the ionospheric reflections may be utilized as well. For example, the receiver may measure both SINR/SNR and the MER/EVM from the received signal carrying the control message. If the SINR/SNR and the MER/EVM estimated from the same received signal represent substantially different communication quality between the transmitter and the receiver, the signal may have travelled through multipath propagation and the ionospheric reflection may be determined to be present. On the other hand, if the SINR/SNR and the MER/EVM estimated from the same received signal represent substantially similar communication quality between the transmitter and the receiver, the signal has probably propagated through a conventional additive white Gaussian noise (AWGN) channel and the ionospheric reflection may be determined to be absent. The SINR/SNR signal power versus noise or noise-plus-interference power while the MER/EVM represents the statistical distribution of modulation symbol errors or a metric representing the modulation symbol errors. As a consequence, these two types of metrics represent the communication quality in a slightly different manner but, together, they may be used to estimate the channel quality more accurately than when using only one of them. For example, multipath propagation of a signal may degrade the MER/EVM value while the SNR/SINR shows good communication quality. Therefore, using both metrics may result in more accurate estimate of the channel quality. These two different types of metrics can be combined or mapped to a mutually comparable scale with routine experimentation of a skilled person. The MER/EVM values and SNR/SINR values mapped to the common, comparable scale enables the determination of the presence/absence of the ionospheric reflection component, for example.

Yet another example of detecting the ionospheric reflections employs frequency-selective property of the ionosphere. The ionosphere is capable of reflecting radio waver only on a limited frequency band at a time, and the bandwidth may be a few Megahertz (MHz). The bandwidth of the frequency band may be considered as fixed. The frequency band may shift over time. but may be considered to be substantially static for several minutes or even dozens of minutes. In an embodiment, the receiver may determine whether or not it is capable of receiving messages from the transmitter, within a certain time window determined on the basis of assumed static duration of the ionosphere, on a plurality of frequency bands such that the frequency bands are separated from one another by a bandwidth higher than the maximum assumed bandwidth of the ionosphere. If the receiver determines that it has received the messages from the transmitter on the plurality of frequency bands within the time window, it may determine that the surface wave component is present.

Yet another embodiment employs a combination of a plurality of above-described embodiments for determining the presence/absence of the surface wave and/or the ionospheric reflection wave. For example, the frequency-selective property of the ionosphere may be used to determine the presence of the surface wave and, additionally, the signal grouping embodiment or the comparison between SINR/SNR and MER/EVM values may be used to determine whether or not there is the additional ionospheric reflection component. Some type of voting logic may be used when using the combination of the multiple embodiments for determining the presence/absence of the surface wave and/or the ionospheric reflection wave, e.g. a majority rule.

Referring to FIG. 11, the matched filter outputs with different symbol timings are analysed and, thus, the correlation peaks for each signal component is derived, e.g. as illustrated in FIG. 10. These correlation peaks are then analysed in block 102 so as to determine whether there is one signal group or two signal groups. On the basis of this analysis, different communication procedures or parameters are applied in block 104.

In an embodiment, the receiver may in the procedure of FIG. 6 use block 102 for the RTS received in S12 to determine whether the communication with the transmitter is carried out via radio waves propagating via ground surface or via radio waves propagating via ionosphere. Upon determining that the radio waves propagate via ground surface, the receiver may select a first backoff factor to modify the value representing the characteristics of the radio channel estimated in S17. Upon determining in block 102 that the radio waves propagate via ionosphere, the receiver may select a second backoff factor different from the first backoff factor. In an embodiment, the second backoff factor is greater than the first backoff factor.

In a further embodiment, when the analysis in block 102 indicates that both ionospheric reflection waves and surface waves are available for a given network node, the communication parameters may be optimized for the transmission of the surface waves or the ionospheric reflection waves. The radio environments are different when transmitting the surface waves and the ionospheric reflection waves. For example, when the ionospheric reflection waves are available between the two network nodes 10 to 12, the radio environments of the network nodes 10 to 12 are typically very different. This results from the fact that ionospheric reflections are typically present between two network nodes located far from each other (hundreds or even thousands of kilometers). For example, a first network node may have completely different set of preferred sub-bands than a second network node because of different interference scenarios. When the ionospheric reflection waves are available, the sub-bands of the data transmission may be selected in S13 of the process of FIG. 6 exclusively on the basis of the receiver's preferred sub-bands regardless whether or not those sub-bands are preferred by the transmitter. The radio environment of the transmitter is assumed not to extend to the receiver and, therefore, sub-bands not preferred by the transmitter may be selected. On the other hand, if the surface waves are preferred over the ionospheric reflection waves in order not to cause unanticipated interference to other network nodes, sub-bands on higher frequencies may be selected for the data transfer, because the ionospheric reflections diminish on the higher frequencies. In yet another embodiment, the network node may determine whether or not to carry out the CSMA procedure (or another channel sensing procedure) prior to the transmission. For example, if it is known that a destination node may be reached through the ionospheric reflection wave, a source node may select those sub-bands that are preferred by the destination node and transmit on those sub-bands without the channel sensing. The channel sensing may be disregarded because of the assumed different radio environments between the source and destination node. Therefore, even though the channel sensing shows that the sub-bands are occupied in the environment of the source node, they may be free at the destination node (because the other interference may be assumed not to reach the destination node, which means that the scanning is not necessary with respect to the operation of the link between the source and the destination node. This assumption may be based on the assumption that the present system utilizes higher transmit powers than the other systems on the same band. In another embodiment, geocasting may be achieved by appropriate selection of a sub-band. For example, if a receiver in a given location is able to utilize a sub-band through the ionospheric reflections, a transmitter may carry out geocasting by selecting that sub-band and transmitting geocasting messages (data or control messages) to other receivers in the same area on that sub-band (and any other corresponding sub-band). Such geocasting receivers even need not be part of any multicast group. Utilizing the geocasting may require at least rough knowledge of the locations of the network nodes, and this may be achieved through any state-of-the-art positioning system (e.g. GPS and exchange of location information between the network nodes). According to another point of view, reverse geocasting may be achieved by the appropriate selection of a sub-band so as to prevent reception of messages in a given geographical area e.g. in some military applications. For example, if a network node in a given location indicates not being able to utilize a sub-band and if an undesired receiver is known to be in or near the same location, a transmitter may select that sub-band and transmit on that sub-band a message that is not desired to be captured by the undesired receiver.

Figure 12:
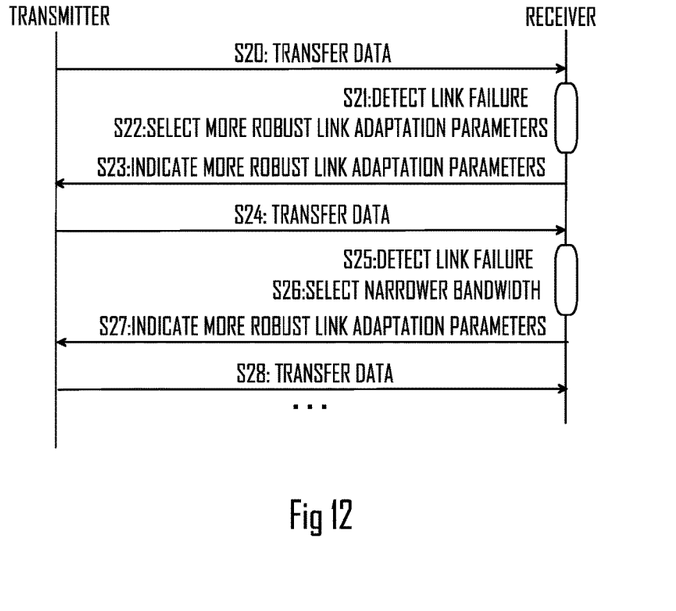
FIG. 12 illustrates an embodiment of a process for adapting to varying channel conditions.

As described above, the channel conditions may vary during the data transmission. FIG. 12 illustrates an embodiment of a procedure for adapting the link adaptation parameters to degrading channel conditions during the data transmission. Referring to FIG. 12, the transmitter and the receiver transmit and receive data packets in S20. In S21, the receiver detects a link failure in the communication with the transmitter. The link failure may refer to erroneous reception of a determined number of data packets or a need for a new initialization phase, e.g. new handshake with the RTS-CTS messages. Upon detecting the link failure in S21, the receiver may select new link adaptation parameters in S22. The new link adaptation parameters may define a more robust modulation scheme and/or a channel coding scheme than that/those used just before the link failure. In S23, the receiver transmits a message to the transmitter, the message comprising an information element indicating the selected new link adaptation parameters.

Upon receiving the message, the transmitter determines the new link adaptation parameters from the information element and processes a subsequent data packet with the new link adaptation parameters. In S24, the transmitter transmits the data packet to the receiver. In S25, the receiver detects that the link failure persists, e.g. the data packet is not detected correctly or not received at all in the receiver in S24. The next step may be for the receiver to select a narrower bandwidth in S26. In an embodiment, the receiver may select a new bandwidth that is half of the bandwidth used in S24 and just before the link failure in S21. In S27, the receiver transmits a message to the transmitter, the message comprising an information element indicating the new bandwidth to be used in subsequent transmissions.

Upon receiving the message in S27, the transmitter may extract the information element and determine the new bandwidth to be used for the subsequent data packets. As a consequence, the transmitter may generate a data packet, process it with the link adaptation parameters received in S23 and transmit with a bandwidth indicated in S27. The transmission of the data packet is carried out in S28. If the receiver still detects that the link failure persists, it reiterate S22 and select even more robust link adaptation parameters and indicate the new link adaptation parameters to the transmitter. In this manner, the receiver may instruct the transmitter alternately to select more robust link adaptation parameters and reduce channel bandwidth until the receiver is capable of detecting correct reception of a data packet. Thereafter, the further reduction of the bandwidth and the switch to the more robust link adaptation parameters may be stopped.

In another embodiment, the receiver may instruct the transmitter first to reduce the bandwidth and, thereafter if the link failure persists, to switch to a more robust link adaptation configuration. In yet another embodiment, the receiver may alternately select a more robust modulation scheme, a more robust channel coding scheme, and a narrower bandwidth. Regarding the modulation scheme, the order for switching to the more robust modulation scheme may be as follows: 256 QAM→128 QAM→64 QAM→32 QAM→16 QAM→8 PSK→QPSK→BPSK. Obviously, if the transmitter and the receiver do not support one or more of the modulation schemes, such an unsupported scheme may be skipped.

In another embodiment, the transmitter detects the link failure in S21 and adapts the link adaptation configuration in a manner similar to that described above. The transmitter may then indicate the new link adaptation parameters to the receiver so that the receiver is capable of decoding the data packets processed with the new link adaptation parameters.

In an analogous manner, the procedure may be used to switch alternately to a higher bandwidth and to the link adaptation parameters that result in a higher data rate in case where the channel conditions improve. As described above, the receiver may regularly monitor the channel characteristics by performing the channel estimation. Similarly, the transmitter may monitor the channel characteristics by performing channel estimation on the basis of received acknowledgment messages, for example. If a node monitoring the channel conditions detects that a value representing the channel characteristics indicates improved channel conditions, the node may alternately widen the bandwidth used for the data packets or to switch to link adaptation parameters providing a higher data rate.

Figure 13:
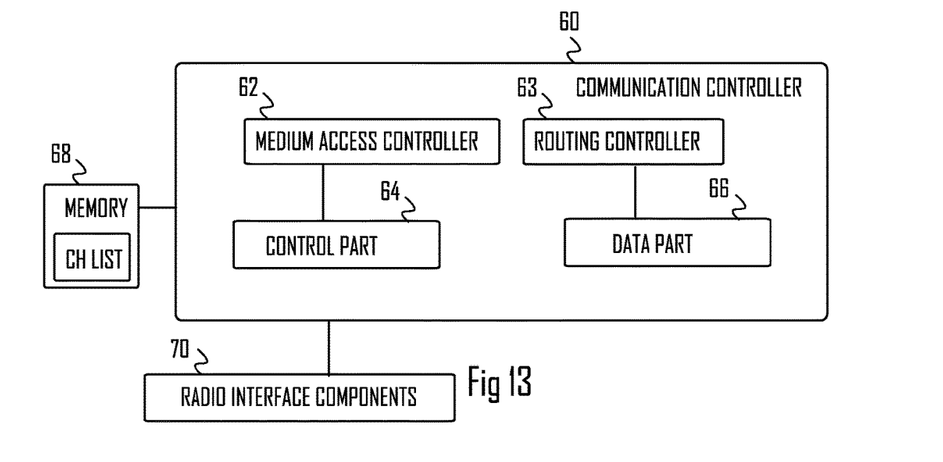
FIG. 13 is a block diagram of an apparatus according to an embodiment of the invention.

FIG. 13 illustrates an embodiment of an apparatus comprising means for carrying out the functionalities of the network node according to any one of the above-described embodiments. The apparatus may be a radio communication apparatus implemented as a portable device, e.g. a computer (PC), a laptop, a tablet computer, a portable radio phone, a mobile radio platform (installed to a vehicle such as a truck or a ship), or any other apparatus provided with radio communication capability. In some embodiments, the apparatus is the vehicle equipped with the radio communication capability. In other embodiments, the apparatus is a fixed station, e.g. a base station. In further embodiments, the apparatus is comprised in any one of the above-mentioned apparatuses, e.g. the apparatus may comprise a circuitry, e.g. a chip, a processor, a micro controller, or a combination of such circuitries in the apparatus.

The apparatus may comprise a communication controller circuitry 60 configured to control the communications in the communication apparatus. The communication controller circuitry 60 may comprise a control part 64 handling control signalling communication with respect to establishment, operation, and termination of the radio connections. The control part 64 may also carry out any other control functionalities related to the operation of the radio links, e.g. transmission, reception, and extraction of the control messages, the RTS/CTS messages, acknowledgment messages, and messages related to the changing the link adaptation parameters and/or bandwidth during the data transmission. The communication controller circuitry 60 may further comprise a data part 66 that handles transmission and reception of payload data over the radio links. The communication controller circuitry 60 may further comprise a medium access controller circuitry 62 configured to carry out the channel selection procedures described above. For example, the medium access controller circuitry 62 may determine the sub-bands to be used in the data transfer on the basis of sub-band preferences. The medium access controller circuitry 62 may also determine the contents for the RTS/CTS messages, e.g. the channel selection, the QoS classification (may be received from higher layers), the link adaptation parameters such as the modulation and coding scheme, etc. The communication controller circuitry 60 may further comprise a routing controller circuitry 63 configured to carry out network layer procedures. The routing controller may control the data part 66 with respect to the transmission of the data. The routing controller circuitry 63 may construct the above-mentioned routing tables on the basis of routing messages received from the neighbour nodes and/or other messages the apparatus detects (e.g. RTS/CTS messages). As a consequence, the routing controller circuitry 63 is configured to control the data part 66 to transmit a given data packet to an appropriate neighbour node.

The circuitries 62 to 66 of the communication controller circuitry 60 may be carried out by the one or more physical circuitries or processors. In practice, the different circuitries may be realized by different computer program modules. Depending on the specifications and the design of the apparatus, the apparatus may comprise some of the circuitries 60 to 66 or all of them.

The apparatus may further comprise the memory 68 that stores computer programs (software) configuring the apparatus to perform the above-described functionalities of the network node. The memory 68 may also store communication parameters and other information needed for the radio communications. For example, the memory may store the routing tables, the mapping table mapping the channel characteristics to the link adaptation parameters and/or to channel bandwidth values, and/or the list of preferred frequencies for each neighbour node. The memory 68 may serve as the buffer for data packets to be transmitted. The apparatus may further comprise radio interface components 70 providing the apparatus with radio communication capabilities with other network nodes. The radio interface components 70 may comprise standard well-known components such as amplifier, filter, frequency-converter, analog-to-digital (A/D) and digital-to-analog (D/A) converters, (de) modulator, and encoder/decoder circuitries and one or more antennas. In particular, the radio interface components 70 may realize the above-mentioned radio receivers 30 to 32, while the matched filter and other signal processing may be carried out by any one of the radio interface components 70, the control part 64, and the data part 66, according to the design of the apparatus. The apparatus may further comprise a user interface enabling interaction with the user. The user interface may comprise a display, a keypad or a keyboard, a loudspeaker, a smartcard and/or fingerprint reader, etc.

As used in this application, the term 'circuitry' refers to all of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

In an embodiment, the apparatus carrying out the embodiments of the invention in the communication apparatus comprises at least one processor and at least one memory including a computer program code, wherein the at least one memory and the computer program code are configured, with the at least one processor, to cause the apparatus to carry out the steps of any one of the processes of FIGS. 2 to 11. Accordingly, the at least one processor, the memory, and the computer program code form processing means for carrying out embodiments of the present invention in the communication apparatus.

In an embodiment, the at least one memory and the computer program code are configured, with the at least one processor, to cause the apparatus to cause a radio communication apparatus to exchange narrowband control messages with other radio communication apparatuses, each control message comprising a pilot sequence and an identifier identifying a transmitter of the control message; to acquire a broadband signal through a broadband radio receiver and correlating sub-bands of the received signal so as to detect a narrowband control message within the received broadband signal; upon detection of the narrowband control message on a sub-band of the received broadband signal, to determine the transmitter of the narrowband control message from the identifier of the narrowband control message; and to determine from the reception of the narrowband control message on the sub-band that the sub-band is preferred by the transmitter of the narrowband control message, and to cause the radio communication apparatus to utilize said sub-band in data communication with the transmitter of the narrowband control message.

The term "narrowband" may be defined with respect to the "broadband" such that the bandwidth of the narrowband control message is lower than the bandwidth of the broadband radio receiver. According to another point of view, the narrowband may be defined with respect to its transmission frequency, e.g. the bandwidth of the narrowband control message is 10% or less than the centre frequency carrying the control message. On the other hand, the bandwidth of the broadband radio receiver is higher than 10% of the centre frequency of the control message.

The processes or methods described in connection with FIGS. 2 to 12 may also be carried out in the form of a computer process defined by a computer program. The computer program may be in source code form, object code form, or in some intermediate form, and it may be stored in some sort of transitory or non-transitory carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to radio telecommunication systems defined above but also to other suitable telecommunication systems. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

What is claimed is:

1. A method for performing link adaptation, comprising in a first network node of a wireless network:
   initializing data transmission with a second network node of the wireless network by transmitting a request-to-send message to the second network node and by receiving a clear-to-send message from the second network node, wherein the request-to-send message and the clear-to-send message are transmitted on one or more channels of the wireless network;
   after said initializing, generating a first data packet of the data transmission, wherein said generating comprises processing the first data packet with link adaptation parameters fixedly associated for use in connection with first data packets of data transmissions, wherein said link adaptation parameters are included in a subset of most robust link adaptation parameters supported by the first network node;
   receiving, from the second network node, a message indicating new link adaptation parameters for use in a subsequent data transmission; and
   generating a second data packet of the data transmission, wherein said generating the second data packet comprises processing the second data packet with the new link adaptation parameters indicated in the message.

2. The method of claim 1, wherein the message indicating the new link adaptation parameters is a first acknowledgment message indicating reception of the first data packet in the second network node.

3. The method of claim 1, wherein the first data packet is transmitted on a different channel than a channel or channels used for transferring the messages communicated during said initializing the data transmission.

4. The method of claim 1, wherein the link adaptation parameters include the most reliable modulation scheme supported by the first network node and the second network node.

5. A method for performing link adaptation between a first network node and a second network node of a wireless network, the method comprising in the second network node:
   initializing data transmission with the first network node by receiving a request-to-send message from the first network node and by transmitting a clear-to-send message to the first network node, wherein the request-to-send message and the clear-to-send message are transmitted on one or more channels of the wireless network;
   after said initializing, receiving a first data packet of the data transmission, wherein the first data packet is processed with link adaptation parameters fixedly associated for use in connection with first data packets of data transmissions, wherein said link adaptation parameters are included in a subset of most robust link adaptation parameters supported by the second network node;
   performing channel estimation on the basis of the received first data packet and determining, on the basis of the channel estimation, new link adaptation parameters matched with channel characteristics of a radio channel between the first network node and the second network node;
   generating a message indicating the new link adaptation parameters and transmitting the message to the first network node; and
   receiving a second data packet of the data transmission from the first network node, wherein said the second data packet is processed with the new link adaptation parameters.

6. The method of claim 5, wherein the message indicating the new link adaptation parameters is a first acknowledgment message indicating reception of the first data packet in the second network node.

7. The method of claim 5, wherein the first data packet is transmitted on a different channel than a channel or channels used for transferring the messages communicated during said initializing the data transmission.

8. The method of claim 5, wherein the link adaptation parameters include the most reliable modulation scheme supported by the first network node and the second network node.

9. The method of 5, wherein said determining the new link adaptation parameters comprises providing a backoff factor that degrades, by a determined degree, the channel characteristics estimated in the channel estimation and selecting the new link adaptation parameters matched with the channel characteristics degraded by the backoff factor.

10. The method of claim 9, further comprising in the second network node:
- determining whether the communication with the first network node is carried out via radio waves propagating via ground surface or via radio waves propagating via ionosphere,
- upon determining that the radio waves propagate via ground surface, selecting a first backoff factor; and
- upon determining that the radio waves propagate via ionosphere, selecting a second backoff factor different from the first backoff factor.

11. The method of claim 5, further comprising in the second network node after said reception of the second data packet:
- detecting a link failure in the data transmission;
- in response to said detection, instructing the first network node alternately to select more robust link adaptation parameters and reduce channel bandwidth until detecting correct reception of data in the second network node.

12. The method of claim 5, wherein the channel estimation comprises estimating at least one of the following channel quality metrics on the basis of the received first data packet: a signal-to-noise ratio, a signal-to-noise-plus-interference ratio, at least one modulation error ratio, and at least one error vector magnitude.

13. An apparatus, comprising:
- at least one processor; and
- at least one memory including a computer program code, wherein the at least one memory and the computer program code are configured, with the at least one processor, to cause a first network node of a wireless network to perform operations comprising:
- initializing data transmission with a second network node of the wireless network by transmitting a request-to-send message to the second network node and by receiving a clear-to-send message from the second network node, wherein the request-to-send message and the clear-to-send message are configured to be transmitted on one or more channels of the wireless network;
- after said initializing, generating a first data packet of the data transmission by processing the first data packet with link adaptation parameters fixedly associated for use in connection with first data packets of data transmissions, wherein said link adaptation parameters are included in a subset of most robust link adaptation parameters supported by the first network node;
- receiving, from the second network node, a message indicating new link adaptation parameters for use in a subsequent data transmission; and
- generating a second data packet of the data transmission, wherein said generating the second data packet comprises processing the second data packet with the new link adaptation parameters indicated in the message.

14. The method of claim 13, wherein the at least one memory and the computer program code are configured, with the at least one processor, to cause the first network node of a wireless network to perform operations comprising transmitting the first data packet on a different channel than a channel or channels used for transferring the messages communicated during said initializing the data transmission.

15. The method of claim 13, wherein the link adaptation parameters include the most reliable modulation scheme supported by the first network node and the second network node.

16. An apparatus, comprising:
- at least one processor; and
- at least one memory including a computer program code, wherein the at least one memory and the computer program code are configured, with the at least one processor, to cause a first network node of a wireless network to perform operations comprising:
- initializing data transmission with a second network node of the wireless network by receiving a request-to-send message from the second network node and by transmitting a clear-to-send message to the second network node, wherein the request-to-send message and the clear-to-send message are configured to be transmitted on one or more channels of the wireless network;
- after said initializing, receiving a first data packet of the data transmission, wherein the first data packet is processed with link adaptation parameters fixedly associated for use in connection with first data packets of data transmissions, wherein said link adaptation parameters are included in a subset of most robust link adaptation parameters supported by the first network node;
- performing channel estimation on the basis of the received first data packet and determine, on the basis of the channel estimation, new link adaptation parameters matched with channel characteristics of a radio channel between the first network node and the second network node;
- generating a message indicating the new link adaptation parameters and transmit the message to the second network node; and
- receiving a second data packet of the data transmission from the second network node, wherein said the second data packet is processed with the new link adaptation parameters.

17. The apparatus of claim 16, wherein the link adaptation parameters include the most reliable modulation scheme supported by the first network node and the second network node.

18. The apparatus of claim 16, wherein the at least one memory and the computer program code are configured, with the at least one processor, to cause the first network node to perform operations comprising determining the new link adaptation parameters by providing a backoff factor that degrades, by a determined degree, the channel characteristics estimated in the channel estimation and to select the new link adaptation parameters matched with the channel characteristics degraded by the backoff factor.

19. The apparatus of claim 18, wherein the at least one memory and the computer program code are configured, with the at least one processor, to cause the first network node to perform operations comprising:
- determining whether the communication with the second network node is carried out via radio waves propagating via ground surface or via radio waves propagating via ionosphere,
- upon determining that the radio waves propagate via ground surface, selecting a first backoff factor; and
- upon determining that the radio waves propagate via ionosphere, selecting a second backoff factor different from the first backoff factor.

* * * * *